United States Patent
Ma

(10) Patent No.: US 9,706,429 B2
(45) Date of Patent: Jul. 11, 2017

(54) SYSTEMS AND METHODS FOR DATA TRANSMISSION IN MOBILE NETWORKS

(71) Applicant: Tencent Technology (Shenzhen) Company Limited, Shenzhen (CN)

(72) Inventor: Lei Ma, Shenzhen (CN)

(73) Assignee: Tencent Technology (Shenzhen) Company Limited, Shenzhen (CN)

(*) Notice: Subject to any disclaimer, the term of this patent is extended or adjusted under 35 U.S.C. 154(b) by 0 days.

(21) Appl. No.: 14/816,229

(22) Filed: Aug. 3, 2015

(65) Prior Publication Data

US 2015/0341822 A1 Nov. 26, 2015

Related U.S. Application Data

(63) Continuation of application No. PCT/CN2014/082306, filed on Jul. 16, 2014.

(30) Foreign Application Priority Data

Jul. 16, 2013 (CN) .......................... 2013 1 0297822

(51) Int. Cl.
*H04W 40/00* (2009.01)
*H04W 72/00* (2009.01)
(Continued)

(52) U.S. Cl.
CPC ....... *H04W 28/0226* (2013.01); *H04W 4/025* (2013.01); *H04W 28/18* (2013.01); *H04W 72/048* (2013.01); *H04W 84/00* (2013.01)

(58) Field of Classification Search
CPC . H04W 4/00; H04W 4/02–4/046; H04W 4/18
See application file for complete search history.

(56) References Cited

U.S. PATENT DOCUMENTS 7,554,920 B2 * 6/2009 Alam .................... H04L 1/1848
370/236
8,468,196 B1 * 6/2013 Roskind ................ H04L 67/325
709/203

(Continued)

FOREIGN PATENT DOCUMENTS

CN 1627846 A 6/2005
CN 102421139 A 4/2012
(Continued)

OTHER PUBLICATIONS

Patent Cooperation Treaty, International Search Report & Written Opinion of the International Searching Authority, PCT/CN2014/082306, mailed Oct. 21, 2014.
(Continued)

*Primary Examiner* — San Htun
(74) *Attorney, Agent, or Firm* — Jones Day

(57) ABSTRACT

Systems and methods are provided for data transmission in a mobile network. For example, a data transmission request is received; location information associated with a current location of a mobile terminal is acquired; one or more transmission parameters determined based on at least information associated with network condition information corresponding to the location information are acquired; and data is uploaded to a server based on at least information associated with the transmission parameters.

10 Claims, 4 Drawing Sheets

(51) Int. Cl.
*H04W 28/02* (2009.01)
*H04W 72/04* (2009.01)
*H04W 28/18* (2009.01)
*H04W 4/02* (2009.01)
*H04W 84/00* (2009.01)

(56) References Cited

U.S. PATENT DOCUMENTS

| | | | | |
|---|---|---|---|---|
| 2009/0070445 A1* | 3/2009 | Gill | ................... | H04M 1/72572 709/222 |
| 2009/0175182 A1* | 7/2009 | Shen | ..................... | H04W 28/18 370/252 |
| 2010/0142522 A1* | 6/2010 | Gardner | ............... | H04L 1/0009 370/389 |
| 2010/0304711 A1* | 12/2010 | Pugliese | ................ | H04L 12/14 455/406 |
| 2010/0323715 A1* | 12/2010 | Winters | ................ | G01S 5/0027 455/456.1 |
| 2012/0094684 A1* | 4/2012 | Reddy | ................... | H04W 4/025 455/456.1 |
| 2012/0309376 A1* | 12/2012 | Huang | .............. | H04M 1/72572 455/418 |

FOREIGN PATENT DOCUMENTS

WO  WO 2010/135931 A1  12/2010
WO  WO 2011/057656 A1  5/2011

OTHER PUBLICATIONS

Patent Cooperation Treaty, International Preliminary Report on Patentability, issued Jan. 19, 2016, in PCT/CN2014/082306.

* cited by examiner

SYSTEMS AND METHODS FOR DATA TRANSMISSION IN MOBILE NETWORKS

CROSS-REFERENCES TO RELATED APPLICATIONS

This application is a continuation of International Application No. PCT/CN2014/082306, with an international filing date of Jul. 16, 2014, now pending, which claims priority to Chinese Patent Application No. 201310297822.6, filed Jul. 16, 2013, both applications being incorporated by reference herein for all purposes.

BACKGROUND OF THE INVENTION

Certain embodiments of the present invention are directed to computer technology. More particularly, some embodiments of the invention provide systems and methods for network technology. Merely by way of example, some embodiments of the invention have been applied to data transmission. But it would be recognized that the invention has a much broader range of applicability.

Mobile networks often involve data transmission. Data of a mobile terminal is uploaded to a server from a mobile terminal, and the mobile terminal downloads data from the server. Presently, certain transmission parameters for data transmission are adjusted based on network conditions of the mobile terminal during a previous time period, so that data transmission between the mobile terminal and the server is performed according to the adjusted transmission parameters.

Conventionally, transmission parameters for data transmission are determined based on previous network conditions of a mobile terminal. However, the mobile terminal changes locations frequently, and it is likely that the location of the mobile terminal at a present time is different from that of the mobile terminal at a previous time. If the transmission parameters of the current time are determined based on network conditions at another location at the previous time, the transmission parameters are not obtained in real time, which results in a low success rate of data transmission. The previous network conditions include an uploading speed or a downloading speed of the mobile terminal, a transmission failure number, signal strength, etc. The transmission parameters include a file fragment size, a connection timeout, etc. The file fragment size corresponds to a size of a minimum transmission unit divided during transmission, and the connection timeout corresponds to a maximum connection time between a mobile terminal and a server before data transmission. As such, the conventional data transmission scheme often has a disadvantage related to the low transmission success rate.

Hence it is highly desirable to improve the techniques for data transmission.

BRIEF SUMMARY OF THE INVENTION

According to one embodiment, a method is provided for data transmission in a mobile network. For example, a data transmission request is received; location information associated with a current location of a mobile terminal is acquired; one or more transmission parameters determined based on at least information associated with network condition information corresponding to the location information are acquired; and data is uploaded to a server based on at least information associated with the transmission parameters.

According to another embodiment, a method is provided for data transmission in a mobile network. For example, a data transmission request is received from a mobile terminal, wherein the data transmission request including location information associated with a current location of the mobile terminal; network condition information corresponding to the location information is acquired; one or more transmission parameters are determined using the network condition information; and data is sent to the mobile terminal based on at least information associated with the transmission parameters.

According to yet another embodiment, a system is provided for data transmission in a mobile network. The system includes: a mobile terminal and a server. The mobile terminal includes: a data transmission request processing unit, a transmission parameter acquiring unit, and a data uploading unit. The data transmission request processing unit is configured to receive a data transmission request, acquire location information associated with a current location of the mobile terminal, and send the location information to the transmission parameter acquiring unit. The transmission parameter acquisition unit is configured to acquire one or more transmission parameters determined based on at least information associated with network condition information corresponding to the location information and send the transmission parameter to the data uploading unit. The data uploading unit is configured to upload data to the server based on at least information associated with the transmission parameters. The server is configured to receive the data from the data uploading unit.

According to yet another embodiment, a system is provided for data transmission in a mobile network. The system includes: a mobile terminal and a server. The server includes: a data transmission request reception unit, a transmission parameter determination unit, and a data issuing unit. The mobile terminal is configured to receive a data transmission request, acquire location information associated with a current location of the mobile terminal, send the data transmission request including the location information to the data transmission request reception unit, and receive data sent by the data issuing unit. The data transmission request reception unit is configured to receive the data transmission request including the location information from the mobile terminal, and send the data transmission request to the transmission parameter determination unit. The transmission parameter determination unit is configured to acquire network condition information corresponding to the location information, determine one or more transmission parameters using the network condition information and send the transmission parameters to the data issuing unit. The data issuing unit is configured to send data to the mobile terminal based on at least information associated with the transmission parameters.

In one embodiment, a mobile terminal includes: a data transmission request processing unit, a transmission parameter acquiring unit, and a data uploading unit. The data transmission request processing unit is configured to receive a data transmission request, acquire location information associated with a current location of the mobile terminal, and send the location information to the transmission parameter acquiring unit. The transmission parameter acquisition unit is configured to one or more transmission parameters determined based on at least information associated with network condition information corresponding to the location information and send the transmission parameter to the data uploading unit. The data uploading unit is configured to upload data to the server based on at least information associated with the transmission parameters.

In another embodiment, a server includes: a data transmission request reception unit, a transmission parameter determination unit, and a data issuing unit. A mobile terminal is configured to receive a data transmission request, acquire location information associated with a current location of the mobile terminal, send the data transmission request including the location information to the data transmission request reception unit, and receive data sent by the data issuing unit. The data transmission request reception unit is configured to receive the data transmission request including the location information from the mobile terminal, and send the data transmission request to the transmission parameter determination unit. The transmission parameter determination unit is configured to acquire network condition information corresponding to the location information, determine one or more transmission parameters using the network condition information and send the transmission parameters to the data issuing unit. The data issuing unit is configured to send data to the mobile terminal based on at least information associated with the transmission parameters.

In yet another embodiment, a non-transitory computer readable storage medium includes programming instructions for data transmission in a mobile network. The programming instructions are configured to cause one or more data processors to execute operations including: receiving a data transmission request; acquiring location information associated with a current location of a mobile terminal; acquiring one or more transmission parameters determined based on at least information associated with network condition information corresponding to the location information; and uploading data to a server based on at least information associated with the transmission parameters.

In yet another embodiment, a non-transitory computer readable storage medium includes programming instructions for data transmission in a mobile network. The programming instructions are configured to cause one or more data processors to execute operations including: receiving a data transmission request from a mobile terminal, wherein the data transmission request including location information associated with a current location of the mobile terminal; acquiring network condition information corresponding to the location information; determining one or more transmission parameters using the network condition information; and sending data to the mobile terminal based on at least information associated with the transmission parameters.

For example, the systems and methods disclosed herein are configured to determine one or more transmission parameters for data transmission based on network conditions corresponding to a current location of a mobile terminal, so as to determine the transmission parameter more accurately. As an example, the systems and methods disclosed herein are configured to determine transmission parameters for data transmission based on network conditions corresponding to the current location of the mobile terminal to ensure the real-time determination of the transmission parameters and improve a success rate and a response time associated with data transmission between the mobile terminal and the server.

Depending upon embodiment, one or more benefits may be achieved. These benefits and various additional objects, features and advantages of the present invention can be fully appreciated with reference to the detailed description and accompanying drawings that follow.

DETAILED DESCRIPTION OF THE INVENTION

Figure 1:
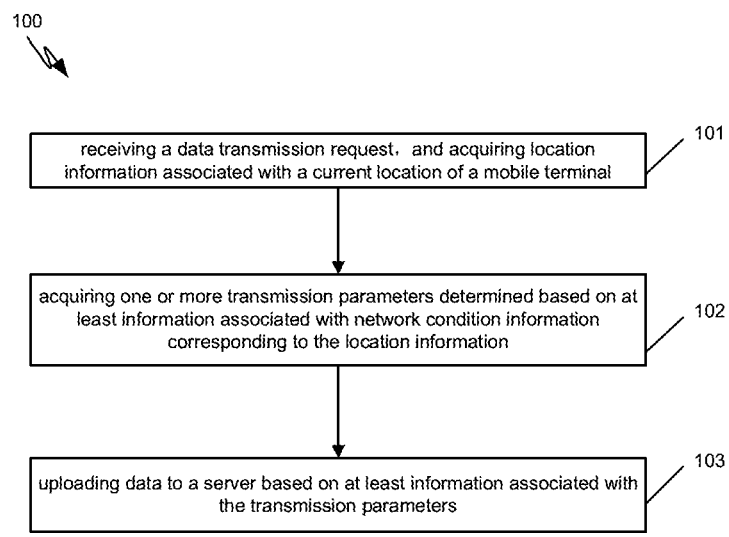
FIG. 1 is a simplified diagram showing a method for data transmission in mobile networks according to one embodiment of the present invention.

FIG. 1 is a simplified diagram showing a method for data transmission in mobile networks according to one embodiment of the present invention. The diagram is merely an example, which should not unduly limit the scope of the claims. One of ordinary skill in the art would recognize many variations, alternatives, and modifications. The method 100 includes at least processes 101-103.

According to one embodiment, the process 101 includes: receiving a data transmission request, and acquiring location information associated with a current location of a mobile terminal. For example, when data transmission is needed, a user inputs the data transmission request to the mobile terminal, and the mobile terminal acquires current location information. The mobile terminal can adopt multiple manners to acquire the current location information, such as the satellite positioning technology, in some embodiments.

According another embodiment, the process 102 includes: acquiring one or more transmission parameters determined based on at least information associated with network condition information corresponding to the location information. The process 102 is performed in different ways. In one embodiment, the mobile terminal sends the location information to a server. The server acquires the network condition information based on at least information associated with the location information and sends the network condition information to the mobile terminal, and the mobile terminal determines the transmission parameters based on at least information associated with the network condition information. In another embodiment, the mobile terminal sends the location information to the server. The server acquires the network condition information based on at least information associated with the location information, determines the transmission parameters based on at least information associated with the network condition information, and sends the transmission parameters to the mobile terminal.

According to yet another embodiment, before the location information is sent to the server, the method 100 further includes: determining whether the transmission parameters corresponding to the current location is locally saved; in response to the transmission parameters corresponding to the current location being locally saved, uploading data to the server according to the saved transmission parameters; and in response to the transmission parameters corresponding to the current location not being locally saved, sending the location information to the server. For example, if the transmission parameters associated with the current location are determined based on the network condition information, the determined transmission parameters can also be saved corresponding to the current location, and a current time can be recorded at the same time for subsequent queries. To improve the accuracy of one or more locally-extracted transmission parameters, historical time periods used for determining whether the transmission parameters corresponding to the current location are locally saved are limited, according to certain embodiments. For example, it is determined whether records of the previous 10 days include the transmission parameters corresponding to the current location.

In some embodiments, after receiving the data transmission request, a mobile terminal instantly reports the location information to the server, so as to determine the transmission parameters. For example, the location information also can be reported after a time period, or be reported when the location changes, so as to determine the transmission parameters. In another example, if the mobile terminal does not instantly report the location information after receiving the data transmission request, the mobile terminal has data transmission with the server by adopting one or more previous transmission parameters.

In certain embodiments, the network condition information corresponds to statistical information collected within a historical time period at the current location of the mobile terminal in a network where the mobile terminal is located. For example, the network condition information includes one or more of: one or more historical network speeds, one or more first historical connection failure rates and one or more historical connection times. In another example, the transmission parameters include one or more of: a connection timeout, a read timeout, a file fragment size, a retry number and a retry time interval. A backend server saves the network condition information associated with different networks at different positions during different periods of time, according to some embodiments. As an example, the transmission parameters include one or more of: a connection timeout, a read timeout, a file fragment size, a retry number and a retry time interval. As another example, the network condition information is associated with a particular location A located in a Unicom network and is recorded for the previous 10 days at a network side. As yet another example, the historical network speeds correspond to collected statistical information related to one or more network speeds for data transmission.

In some embodiments, a historical connection failure rate corresponds to a ratio of a number of connection failures and a number of connection attempts obtained from collected statistical connection information. For example, if information related to 100 connection attempts is collected at the network side and 90 connection attempts fail, the historical connection failure rate corresponds to 90%. In another example, a historical connection time corresponds to collected statistical information related to one or more connection times between a server and a terminal.

According to some embodiments, the determination of the transmission parameters can be performed in different ways as follows. In one embodiment, a connection timeout is determined. The connection timeout corresponds to a maximum connection time between a mobile terminal and a server before data transmission, and is determined based on one or more historical connection times. The determination of the connection timeout includes: averaging the historical connection times to obtain an average connection time t; and setting the connection timeout to a value t1 that is greater than the average connection time, where more than 50% of the historical connection times are smaller than t1, and the rest of the historical connection times are greater than t1. As an example, more than 95% of the historical connection times are smaller than t1, and 5% of the connection times are greater than t1. In certain embodiments, a range of connection timeouts can be preset. For example, a minimum value is set to 10 seconds, and a maximum value is set to 60 seconds. The connection timeout t1 is within the range.

In another embodiment, a file fragment size is determined. For example, the file fragment size corresponds to a size of a minimum transmission unit for data transmission, and is determined based on one or more historical network speeds. The determination of the file fragment size includes: averaging the historical network speeds in the historical time period to obtain a historical average network speed; and determining whether the historical average speed is greater than a high speed threshold, smaller than a low speed threshold, or between the high speed threshold and the low speed threshold. The determination of the file fragment size further includes: in response to the historical average speed being greater than the high speed threshold, setting the file fragment size to be a file fragment high threshold; in response to the historical average speed being smaller than the low speed threshold, setting the file fragment size to be a file fragment low threshold; and in response to the historical average speed being between the high speed threshold and the low speed threshold, setting the file fragment size to be a file fragment normal value. In certain embodiments, a range of the file fragment size is greater than or equal to the file fragment low threshold and smaller than or equal to the file fragment high threshold. For example, the file fragment low threshold is 4 k, the file fragment high threshold is 128 k, and the file fragment normal value is 16 k. In another example, when a historical average network speed is lower, a file fragment size is set to be a smaller value. In yet another example, when the historical average network speed is higher, the file fragment size is set to be a lager value. In yet another example, when a historical average network speed is lower than 1 k, the minimum fragment of 4 k is adopted. In yet another example, when the network speed is higher than 6 k, the maximum fragment of 128 k is adopted. In yet another example, under certain conditions, a default fragment of 16 k is adopted. The file fragment is related to one or more historical connection failure rates, and the file fragment size can be determined based on the combination of a historical network speed and a historical connection failure rate, in some embodiments. For example, if the historical connection failure rate is higher, the file fragment size is set to be a file fragment low threshold.

In yet another embodiment, before the process for determining whether the historical average speed is greater than a high speed threshold, smaller than a low speed threshold, or between the high speed threshold and the low speed threshold, the method 100 further includes: determining whether a historical connection failure rate is greater than a failure rate threshold. For example, if the historical connection failure rate is greater than the failure rate threshold, the file fragment size is set to be file fragment low threshold. If the historical connection failure rate is not greater than the failure rate threshold, the process for determining whether the historical average speed is greater than a high speed threshold, smaller than a low speed threshold, or between the high speed threshold and the low speed threshold is executed.

According to one embodiment, a retry number and a retry time interval are determined. For example, a connection between a mobile terminal and a server is established before data transmission. If the connection fails, reconnection is performed. As an example, a number of the reconnections corresponds to a retry number, and a time interval of the reconnections corresponds to a retry time interval. Collected historical connection failure rates correspond to first historical connection failure rates, and the retry number and the retry time interval are determined based on at least information associated with the first historical connection failure rates. For example, the determination of the retry number and the retry time interval includes: acquiring one or more second historical connection failure rates associated with an area adjacent to the current location of the mobile terminal, and determining whether the first historical connection failure rates are higher than a failure rate high threshold, lower than a failure rate low threshold, or between the failure rate high threshold and the failure rate low threshold. In another example, the determination of the retry number and the retry time interval further includes: in response to the first historical connection failure rates being higher than the failure rate high threshold, determining whether the second historical connection failure rates are higher than the failure rate high threshold; in response to the second historical connection failure rates being higher than the failure rate high threshold, setting the retry number to be a retry number low threshold and setting the retry time interval to be a first normal value; and in response to the second historical connection failure rates being not higher than the failure rate high threshold, increasing the retry number and the retry time interval. In yet another example, the determination of the retry number and the retry time interval further includes: in response to the first historical connection failure rates being lower than the failure rate low threshold, setting the retry number to be a second normal value and setting the retry time interval to be a retry time interval low threshold; in response to the first historical connection failure rates being between the failure rate high threshold and the failure rate low threshold, setting the retry number to be the second normal value and setting the retry time interval to be the first normal value.

According to another embodiment, a retry number low threshold and a retry number high threshold are utilized to determine a range of the retry number. For example, the retry number low threshold and the retry number high threshold are 0 and 10 respectively. A retry time interval low threshold and a retry time interval high threshold are utilized to determine a range of the retry time interval. As an example, the retry time interval low threshold and the retry time interval high threshold are 0 and 60 s respectively.

According to yet another embodiment, a read timeout is determined. For example, the read timeout corresponds to time spent from the beginning of data transmission to the end of data transmission, and is determined based on a historical network speed and a file fragment size. The file fragment size can be determined as described above, in some embodiments. For example, the determination of the read timeout includes: setting a value v, where more than 50% of the historical network speeds are greater than v and the rest of the historical network speeds are smaller than v; and setting the read timeout to be M, wherein M=L*2/V, and L represents a determined file segment size. As an example, a range of a read timeout can be preset, where a minimum value is 15 s and a maximum value is 180 s. If a calculated read timeout M is not in the range, an adjacent threshold is adopted, in certain embodiments. For example, if the calculated read timeout is greater than 180, M is set to be 180, and if the calculated read timeout is smaller than 15, M is set to be 15.

In one embodiment, the process 103 includes: uploading data to a server based on at least information associated with the transmission parameters.

Figure 2:
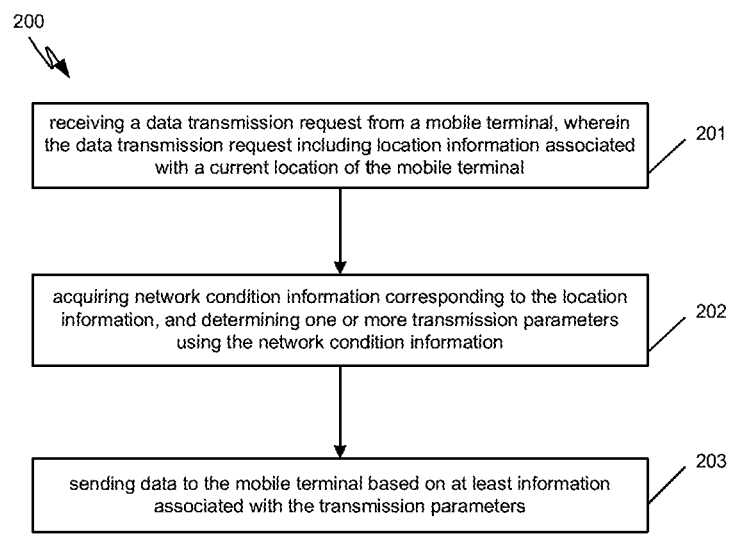
FIG. 2 is a simplified diagram showing a method for data transmission in mobile networks according to another embodiment of the present invention.

FIG. 2 is a simplified diagram showing a method for data transmission in mobile networks according to another embodiment of the present invention. The diagram is merely an example, which should not unduly limit the scope of the claims. One of ordinary skill in the art would recognize many variations, alternatives, and modifications. The method 200 includes at least processes 201-203.

According to one embodiment, the process 201 includes: receiving a data transmission request from a mobile terminal, wherein the data transmission request including location information associated with a current location of the mobile terminal. For example, when data transmission is needed, the user inputs the data transmission request to the mobile terminal, and the mobile terminal acquires the current location information and sends the current location information to the server.

According to another embodiment, the process 202 includes: acquiring network condition information corresponding to the location information and determining one or more transmission parameters using the network condition information. For example, the network condition information corresponds to statistical information collected within a historical time period at the current location of the mobile terminal in a network where the mobile terminal is located. In another example, the network condition information includes one or more of: one or more historical network speeds, one or more first historical connection failure rates and one or more historical connection times. In yet another example, the transmission parameters include one or more of: a connection timeout, a read timeout, a file fragment size, a retry number and a retry time interval. The transmission parameters are determined based on the network condition information, similar to the process 102, in some embodiments.

According to yet another embodiment, before acquiring the network condition information based on the location information, the method 200 further includes: determining whether the transmission parameters corresponding to the current location is locally saved; in response to the transmission parameters corresponding to the current location being locally saved, uploading data to the server according to the saved transmission parameters; and in response to the transmission parameters corresponding to the current location not being locally saved, executing the process for acquiring the network condition information based on the location information. If transmission parameters of a current location are determined based on the network condition information, the determined transmission parameters can be saved corresponding to the current location, and a current time can be recorded for future inquiries, in some embodiments. A historical time period used for determining whether the transmission parameters corresponding to the current location are locally saved can be limited, so as to improve the accuracy of the locally-extracted transmission parameters, in certain embodiments. As an example, whether the transmission parameters corresponding to the current location are included in records of previous 10 days is determined.

In one embodiment, after receiving a data transmission request, a mobile terminal instantly reports location information to a server, so as to determine the transmission parameters. For example, the location information also can be reported after a time period, or be reported when the location changes to determine the transmission parameters. In another example, if the mobile terminal does not instantly report the location information after receiving the data transmission request, the server performs data transmission with the mobile terminal using previous transmission parameters.

In another embodiment, the process 203 includes: sending data to the mobile terminal based on at least information associated with the transmission parameters.

Figure 3:
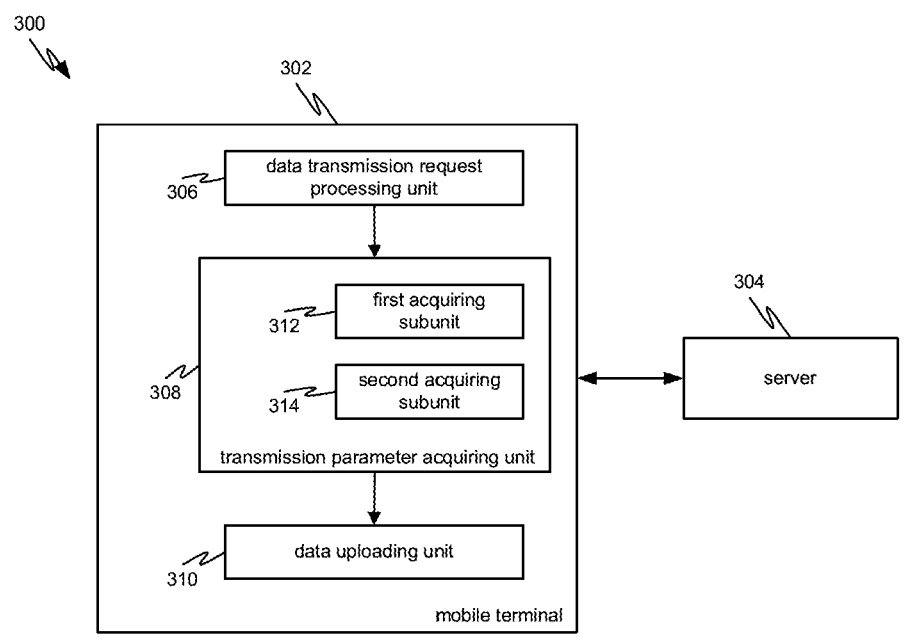
FIG. 3 is a simplified diagram showing a system for data transmission in mobile networks according to one embodiment of the present invention.

FIG. 3 is a simplified diagram showing a system for data transmission in mobile networks according to one embodiment of the present invention. The diagram is merely an example, which should not unduly limit the scope of the claims. One of ordinary skill in the art would recognize many variations, alternatives, and modifications. The system 300 includes a mobile terminal 302 and a server 304.

According to one embodiment, the mobile terminal 302 includes a data transmission request processing unit 306, a transmission parameter acquisition unit 308 and a data uploading unit 310. For example, the data transmission request processing unit 306 is configured to receive a data transmission request, acquire location information associated with a current location of the mobile terminal 302, and send the location information to the transmission parameter acquiring unit. As an example, the transmission parameter acquisition unit 308 is configured to one or more transmission parameters determined based on at least information associated with network condition information corresponding to the location information and send the transmission parameter to the data uploading unit. In another example, the data uploading unit 310 is configured to upload data to the server 304 based on at least information associated with the transmission parameters. The server 304 is configured to receive the data from the data uploading unit 310, in some embodiments.

According to another embodiment, the transmission parameter acquisition unit 308 includes a first acquiring subunit 312 configured to send the location information to the server, receive the network condition information from the server, and determine the transmission parameters based on at least information associated with the network condition information. For example, the server 304 acquires the network condition information based on at least information associated with the location information and sends the network condition information to the first acquiring subunit 312. In another example, the network condition information corresponds to statistical information collected within a historical time period at the current location of the mobile terminal 302 in a network where the mobile terminal 302 is located. In yet another example, the network condition information includes one or more of: one or more historical network speeds, one or more first historical connection failure rates and one or more historical connection times. In yet another example, the transmission parameters include one or more of: a connection timeout, a read timeout, a file fragment size, a retry number and a retry time interval.

According to yet another embodiment, the transmission parameter acquisition unit 308 includes a second acquiring subunit 314 configured to send the location information to the server 304 and receive the transmission parameters from the server 304. For example, the server 304 is configured to receive the location information from the second acquiring subunit 308, acquire the network condition information based on at least information associated with the location information, determine the transmission parameters based on at least information associated with the network condition information, and send the transmission parameters to the second acquiring subunit 308. In another example, the network condition information corresponds to statistical information collected within a historical time period at the current location of the mobile terminal 302 in a network where the mobile terminal 302 is located. In yet another example, the network condition information includes one or more of: one or more historical network speeds, one or more first historical connection failure rates and one or more historical connection times. In yet another example, the transmission parameters include one or more of: a connection timeout, a read timeout, a file fragment size, a retry number and a retry time interval. The transmission parameters are determined based on the network condition information similar to the process 102, in some embodiments.

Figure 4:
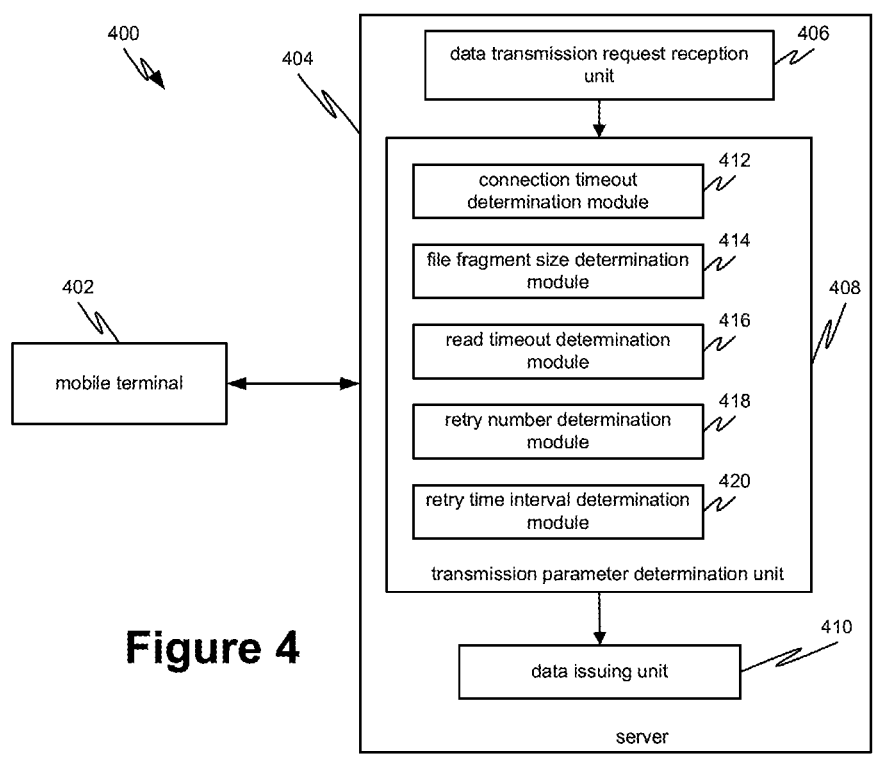
FIG. 4 is a simplified diagram showing a system for data transmission in mobile networks according to another embodiment of the present invention.

FIG. 4 is a simplified diagram showing a system for data transmission in mobile networks according to another embodiment of the present invention. The diagram is merely an example, which should not unduly limit the scope of the claims. One of ordinary skill in the art would recognize many variations, alternatives, and modifications. The system 400 includes a mobile terminal 402 and a server 404.

According to one embodiment, the server 404 includes a data transmission request reception unit 406, a transmission parameter determination unit 408 and a data issuing unit 410. For example, the mobile terminal 402 is configured to receive a data transmission request, acquire location information associated with a current location of the mobile terminal 402, send the data transmission request including the location information to the data transmission request reception unit 406, and receive data sent by the data issuing unit 410. In another example, the data transmission request reception unit 406 is configured to receive the data transmission request including the location information from the mobile terminal 402, and send the data transmission request to the transmission parameter determination unit 408. In yet another example, the transmission parameter determination unit 408 is configured to acquire network condition information corresponding to the location information, determine one or more transmission parameters using the network condition information and send the transmission parameters to the data issuing unit 410. In yet another example, the data issuing unit 410 is configured to send data to the mobile terminal 402 based on at least information associated with the transmission parameters.

According to another embodiment, the network condition information corresponds to statistical information collected within a historical time period at the current location of the mobile terminal 402 in a network where the mobile terminal 402 is located. For example, the network condition information includes one or more of: one or more historical network speeds, one or more first historical connection failure rates and one or more historical connection times.

According to yet another embodiment, the transmission parameter determination unit 408 includes a connection timeout determination module 412 configured to average the historical connection times to obtain an average connection time t, and set the connection timeout to a value t1 that is greater than the average connection time. For example, more than 50% of the historical connection times are smaller than t1, and the rest of the historical connection times are greater than t1.

In one embodiment, the transmission parameter determination unit 408 includes a file fragment size determination module 414 configured to: average the historical network speeds in the historical time period to obtain a historical average network speed; determine whether the historical average speed is greater than a high speed threshold, smaller than a low speed threshold, or between the high speed threshold and the low speed threshold; in response to the historical average speed being greater than the high speed threshold, set the file fragment size to be a file fragment high threshold; in response to the historical average speed being smaller than the low speed threshold, set the file fragment size to be a file fragment low threshold; and in response to the historical average speed being between the high speed threshold and the low speed threshold, set the file fragment size to be a file fragment normal value.

In another embodiment, the transmission parameter determination unit 408 includes: a retry number determination module 416. For example, the retry number determination module 416 is configured to: acquire one or more second historical connection failure rates associated with an area adjacent to the current location of the mobile terminal 402; determine whether the first historical connection failure rates are higher than a failure rate high threshold, lower than a failure rate low threshold, or between the failure rate high threshold and the failure rate low threshold; and in response to the first historical connection failure rates being higher than the failure rate high threshold, determine whether the second historical connection failure rates are higher than the failure rate high threshold. In another example, the retry number determination module 416 is further configured to: in response to the second historical connection failure rates being higher than the failure rate high threshold, set the retry number to be a retry number low threshold; in response to the second historical connection failure rates being not higher than the failure rate high threshold, increase the retry number; in response to the first historical connection failure rates being lower than the failure rate low threshold, set the retry number to be a second normal value; and in response to the first historical connection failure rates being between the failure rate high threshold and the failure rate low threshold, set the retry number to be the second normal value.

In yet another embodiment, the transmission parameter determination unit 408 includes: a retry time interval determination module 418. For example, the retry time interval determination module 418 is configured to: acquire the second historical connection failure rates associated with an area adjacent to the current location of the mobile terminal 402; determine whether the first historical connection failure rates are higher than the failure rate high threshold, lower than the failure rate low threshold, or between the failure rate high threshold and the failure rate low threshold; and in response to the first historical connection failure rates being higher than the failure rate high threshold, determine whether the second historical connection failure rates are higher than the failure rate high threshold. In another example, the retry time interval determination module 418 is further configured to: in response to the second historical connection failure rates being higher than the failure rate high threshold, set the retry time interval to be a first normal value; in response to the second historical connection failure rates being not higher than the failure rate high threshold, increase the retry time interval; in response to the first historical connection failure rates being lower than the failure rate low threshold, set the retry time interval to be a retry time interval low threshold; and in response to the first historical connection failure rates being between the failure rate high threshold and the failure rate low threshold, set the retry time interval to be the first normal value.

In yet another embodiment, the transmission parameter determination unit 408 includes: a read timeout determination module 420 configured to: set a value v, wherein more than 50% of the historical network speeds are greater than v and the rest of the historical network speeds are smaller than v; and set the read timeout to be M, wherein $M=L*2/V$, and L represents a determined file segment size.

According to one embodiment, a method is provided for data transmission in a mobile network. For example, a data transmission request is received; location information associated with a current location of a mobile terminal is acquired; one or more transmission parameters determined based on at least information associated with network condition information corresponding to the location information are acquired; and data is uploaded to a server based on at least information associated with the transmission parameters. For example, the method is implemented according to at least FIG. 1.

As an example, the acquiring one or more transmission parameters determined based on at least information associated with network condition information corresponding to the location information includes: sending the location information to a server. The server acquires the network condition information based on at least information associated with the location information and sends the network condition information to the mobile terminal. The mobile terminal determines the transmission parameters based on at least information associated with the network condition information. As another example, whether the transmission parameters corresponding to the current location is locally saved is determined. In response to the transmission parameters corresponding to the current location being locally saved, data is uploaded to the server according to the saved transmission parameters. In response to the transmission parameters corresponding to the current location not being locally saved, the location information is sent to the server.

According to another embodiment, a method is provided for data transmission in a mobile network. For example, a data transmission request is received from a mobile terminal, wherein the data transmission request including location information associated with a current location of the mobile terminal; network condition information corresponding to the location information is acquired; one or more transmission parameters are determined using the network condition information; and data is sent to the mobile terminal based on at least information associated with the transmission parameters. For example, the method is implemented according to at least FIG. 2.

According to yet another embodiment, a system is provided for data transmission in a mobile network. The system includes: a mobile terminal and a server. The mobile terminal includes: a data transmission request processing unit, a transmission parameter acquiring unit, and a data uploading unit. The data transmission request processing unit is configured to receive a data transmission request, acquire location information associated with a current location of the mobile terminal, and send the location information to the transmission parameter acquiring unit. The transmission parameter acquisition unit is configured to one or more transmission parameters determined based on at least information associated with network condition information corresponding to the location information and send the transmission parameter to the data uploading unit. The data uploading unit is configured to upload data to the server based on at least information associated with the transmission parameters. The server is configured to receive the data from the data uploading unit. For example, the system is implemented according to at least FIG. 3.

As an example, the transmission parameter acquisition unit includes: a first acquiring subunit configured to send the location information to the server, receive the network condition information from the server, and determine the transmission parameters based on at least information associated with the network condition information; the server acquires the network condition information based on at least information associated with the location information and sends the network condition information to the first acquiring subunit; the network condition information corresponds to statistical information collected within a historical time period at the current location of the mobile terminal in a network where the mobile terminal is located; the network condition information includes one or more of: one or more historical network speeds, one or more first historical connection failure rates and one or more historical connection times; and the transmission parameters include one or more of: a connection timeout, a read timeout, a file fragment size, a retry number and a retry time interval. As another example, the transmission parameter acquisition unit includes a second acquiring subunit configured to send the location information to the server and receive the transmission parameters from the server. The server is configured to receive the location information from the second acquiring subunit, acquire the network condition information based on at least information associated with the location information, determine the transmission parameters based on at least information associated with the network condition information, and send the transmission parameters to the second acquiring subunit. The network condition information corresponds to statistical information collected within a historical time period at the current location of the mobile terminal in a network where the mobile terminal is located. The network condition information includes one or more of: one or more historical network speeds, one or more first historical connection failure rates and one or more historical connection times. The transmission parameters include one or more of: a connection timeout, a read timeout, a file fragment size, a retry number and a retry time interval.

According to yet another embodiment, a system is provided for data transmission in a mobile network. The system includes: a mobile terminal and a server. The server includes: a data transmission request reception unit, a transmission parameter determination unit, and a data issuing unit. The mobile terminal is configured to receive a data transmission request, acquire location information associated with a current location of the mobile terminal, send the data transmission request including the location information to the data transmission request reception unit, and receive data sent by the data issuing unit. The data transmission request reception unit is configured to receive the data transmission request including the location information from the mobile terminal, and send the data transmission request to the transmission parameter determination unit. The transmission parameter determination unit is configured to acquire network condition information corresponding to the location information, determine one or more transmission parameters using the network condition information and send the transmission parameters to the data issuing unit. The data issuing unit is configured to send data to the mobile terminal based on at least information associated with the transmission parameters. For example, the system is implemented according to at least FIG. 4.

As an example, the network condition information corresponds to statistical information collected within a historical time period at the current location of the mobile terminal in a network where the mobile terminal is located. The network condition information includes one or more of: one or more historical network speeds, one or more first historical connection failure rates and one or more historical connection times. As another example, the transmission parameter determination unit includes a connection timeout determination module. The connection timeout determination module is configured to average the historical connection times to obtain an average connection time t, and set the connection timeout to a value t1 that is greater than the average connection time, wherein more than 50% of the historical connection times are smaller than t1, and the rest of the historical connection times are greater than t1. As yet another example, the transmission parameter determination unit includes a file fragment size determination module. The file fragment size determination module is configured to: average the historical network speeds in the historical time period to obtain a historical average network speed; determine whether the historical average speed is greater than a high speed threshold, smaller than a low speed threshold, or between the high speed threshold and the low speed threshold; in response to the historical average speed being greater than the high speed threshold, set the file fragment size to be a file fragment high threshold; in response to the historical average speed being smaller than the low speed threshold, set the file fragment size to be a file fragment low threshold; and in response to the historical average speed being between the high speed threshold and the low speed threshold, set the file fragment size to be a file fragment normal value.

For example, the transmission parameter determination unit includes: a retry number determination module and a retry time interval determination module. The retry number determination module is configured to: acquire one or more second historical connection failure rates associated with an area adjacent to the current location of the mobile terminal; determine whether the first historical connection failure rates are higher than a failure rate high threshold, lower than a failure rate low threshold, or between the failure rate high threshold and the failure rate low threshold; in response to the first historical connection failure rates being higher than the failure rate high threshold, determine whether the second historical connection failure rates are higher than the failure rate high threshold; in response to the second historical connection failure rates being higher than the failure rate high threshold, set the retry number to be a retry number low threshold; in response to the second historical connection failure rates being not higher than the failure rate high threshold, increase the retry number; in response to the first historical connection failure rates being lower than the failure rate low threshold, set the retry number to be a second normal value; and in response to the first historical connection failure rates being between the failure rate high threshold and the failure rate low threshold, set the retry number to be the second normal value. The retry time interval determination module is configured to: acquire the second historical connection failure rates associated with an area adjacent to the current location of the mobile terminal; determine whether the first historical connection failure rates are higher than the failure rate high threshold, lower than the failure rate low threshold, or between the failure rate high threshold and the failure rate low threshold; in response to the first historical connection failure rates being higher than the failure rate high threshold, determine whether the second historical connection failure rates are higher than the failure rate high threshold; in response to the second historical connection failure rates being higher than the failure rate high threshold, set the retry time interval to be a first normal value; in response to the second historical connection failure rates being not higher than the failure rate high threshold, increase the retry time interval; in response to the first historical connection failure rates being lower than the failure rate low threshold, set the retry time interval to be a retry time interval low threshold; and in response to the first historical connection failure rates being between the failure rate high threshold and the failure rate low threshold, set the retry time interval to be the first normal value.

As an example, the transmission parameter determination unit includes: a read timeout determination module. The read timeout determination module is configured to: set a value v, wherein more than 50% of the historical network speeds are greater than v and the rest of the historical network speeds are smaller than v; and set the read timeout to be M, wherein M=L*2/V, and L represents a determined file segment size.

In one embodiment, a mobile terminal includes: a data transmission request processing unit, a transmission parameter acquiring unit, and a data uploading unit. The data transmission request processing unit is configured to receive a data transmission request, acquire location information associated with a current location of the mobile terminal, and send the location information to the transmission parameter acquiring unit. The transmission parameter acquisition unit is configured to one or more transmission parameters determined based on at least information associated with network condition information corresponding to the location information and send the transmission parameter to the data uploading unit. The data uploading unit is configured to upload data to the server based on at least information associated with the transmission parameters. For example, the mobile terminal is implemented according to at least FIG. 3.

As an example, the mobile terminal further includes: one or more data processors; and a computer-readable storage medium. One or more of the data transmission request processing unit, the transmission parameter acquiring unit, and the data uploading unit are stored in the storage medium and configured to be executed by the one or more data processors. As another example, the transmission parameter acquisition unit includes a second acquiring subunit configured to send the location information to the server and receive the transmission parameters from the server. The server is configured to receive the location information from the second acquiring subunit, acquire the network condition information based on at least information associated with the location information, determine the transmission parameters based on at least information associated with the network condition information, and send the transmission parameters to the second acquiring subunit. The network condition information corresponds to statistical information collected within a historical time period at the current location of the mobile terminal in a network where the mobile terminal is located. The network condition information includes one or more of: one or more historical network speeds, one or more first historical connection failure rates and one or more historical connection times. The transmission parameters include one or more of: a connection timeout, a read timeout, a file fragment size, a retry number and a retry time interval.

In another embodiment, a server includes: a data transmission request reception unit, a transmission parameter determination unit, and a data issuing unit. A mobile terminal is configured to receive a data transmission request, acquire location information associated with a current location of the mobile terminal, send the data transmission request including the location information to the data transmission request reception unit, and receive data sent by the data issuing unit. The data transmission request reception unit is configured to receive the data transmission request including the location information from the mobile terminal, and send the data transmission request to the transmission parameter determination unit. The transmission parameter determination unit is configured to acquire network condition information corresponding to the location information, determine one or more transmission parameters using the network condition information and send the transmission parameters to the data issuing unit. The data issuing unit is configured to send data to the mobile terminal based on at least information associated with the transmission parameters. For example, the server is implemented according to at least FIG. 4.

As an example, the server further includes: one or more data processors; and a computer-readable storage medium. One or more of the data transmission request reception unit, the transmission parameter determination unit, and the data issuing unit are stored in the storage medium and configured to be executed by the one or more data processors.

In yet another embodiment, a non-transitory computer readable storage medium includes programming instructions for data transmission in a mobile network. The programming instructions are configured to cause one or more data processors to execute operations including: receiving a data transmission request; acquiring location information associated with a current location of a mobile terminal; acquiring one or more transmission parameters determined based on at least information associated with network condition information corresponding to the location information; and uploading data to a server based on at least information associated with the transmission parameters. For example, the storage medium is implemented according to at least FIG. 1.

In yet another embodiment, a non-transitory computer readable storage medium includes programming instructions for data transmission in a mobile network. The programming instructions are configured to cause one or more data processors to execute operations including: receiving a data transmission request from a mobile terminal, wherein the data transmission request including location information associated with a current location of the mobile terminal; acquiring network condition information corresponding to the location information; determining one or more transmission parameters using the network condition information; and sending data to the mobile terminal based on at least information associated with the transmission parameters. For example, the storage medium is implemented according to at least FIG. 2.

The above only describes several scenarios presented by this invention, and the description is relatively specific and detailed, yet it cannot therefore be understood as limiting the scope of this invention. It should be noted that ordinary technicians in the field may also, without deviating from the invention's conceptual premises, make a number of variations and modifications, which are all within the scope of this invention. As a result, in terms of protection, the patent claims shall prevail.

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, various embodiments and/or examples of the present invention can be combined.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to perform the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions (e.g., software) for use in execution by a processor to perform the methods' operations and implement the systems described herein. The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The relationship of client device and server arises by virtue of computer programs running on the respective computers and having a client device-server relationship to each other.

This specification contains many specifics for particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a combination can in some cases be removed from the combination, and a combination may, for example, be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present invention have been described, it is understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method for data transmission in a mobile network, the method comprising:
   receiving a data transmission request;
   acquiring location information associated with a current location of a mobile terminal;
   acquiring one or more transmission parameters determined based on at least information associated with network condition information corresponding to the location information; and
   uploading data to a server based on at least information associated with the one or more transmission parameters,
   wherein:
      the network condition information corresponds to statistical information collected within a historical time period at the current location of the mobile terminal in a network where the mobile terminal is located;
      the network condition information includes one or more of: one or more historical network speeds, one or more first historical connection failure rates and one or more historical connection times;
      the one or more transmission parameters include one or more of: a connection timeout, a read timeout, a file fragment size, a retry number and a retry time interval;
      the connection timeout is determined; and
      the determination of the connection timeout includes:
         averaging the historical connection times to obtain an average connection time t; and
         setting the connection timeout to a value t1 that is greater than the average connection time, wherein more than 50% of the historical connection times are smaller than t1, and the rest of the historical connection times are greater than t1.

2. The method of claim 1, wherein the acquiring one or more transmission parameters determined based on at least information associated with network condition information corresponding to the location information includes:
   sending the location information to a server;
   wherein:
      the server acquires the network condition information based on at least information associated with the location information and sends the network condition information to the mobile terminal; and the mobile terminal determines the one or more transmission parameters based on at least information associated with the network condition information.

3. The method of claim 1, wherein the acquiring one or more transmission parameters determined based on at least information associated with network condition information corresponding to the location information includes;

sending the location information to a server;

wherein the server acquires the network condition information based on at least information associated with the location information, determines the one or more transmission parameters based on at least information associated with the network condition information, and sends the one or more transmission parameters to the mobile terminal.

4. A method for data transmission in a mobile network, the method comprising:

receiving a data transmission request;

acquiring location information associated with a current location of a mobile terminal;

acquiring one or more transmission parameters determined based on at least information associated with network condition information corresponding to the location information; and uploading data to a server based on at least information associated with the one or more transmission parameters, wherein:

the network condition information corresponds to statistical information collected within a historical time period at the current location of the mobile terminal in a network where the mobile terminal is located;

the network condition information includes one or more of: one or more historical network speeds, one or more first historical connection failure rates and one or more historical connection times;

the one or more transmission parameters include one or more of: a connection timeout, a read timeout, a file fragment size, a retry number and a retry time interval;

the file fragment size is determined; and the determination of the file fragment size includes:

averaging the historical network speeds in the historical time period to obtain a historical average network speed;

determining whether the historical average speed is greater than a high speed threshold, smaller than a low speed threshold, or between the high speed threshold and the low speed threshold;

in response to the historical average speed being greater than the high speed threshold, setting the file fragment size to be a file fragment high threshold;

in response to the historical average speed being smaller than the low speed threshold, setting the file fragment size to be a file fragment low threshold; and in response to the historical average speed being between the high speed threshold and the low speed threshold, setting the file fragment size to be a file fragment normal value.

5. A method for data transmission in a mobile network, the method comprising:

receiving a data transmission request;

acquiring location information associated with a current location of a mobile terminal;

acquiring one or more transmission parameters determined based on at least information associated with network condition information corresponding to the location information; and uploading data to a server based on at least information associated with the one or more transmission parameters, wherein:

the network condition information corresponds to statistical information collected within a historical time period at the current location of the mobile terminal in a network where the mobile terminal is located;

the network condition information includes one or more of: one or more historical network speeds, one or more first historical connection failure rates and one or more historical connection times;

the one or more transmission parameters include one or more of: a connection timeout, a read timeout, a file fragment size, a retry number and a retry time interval;

the retry number and the retry time interval are determined; and the determination of the retry number and the retry time interval includes:

acquiring one or more second historical connection failure rates associated with an area adjacent to the current location of the mobile terminal;

determining whether the first historical connection failure rates are higher than a failure rate high threshold, lower than a failure rate low threshold, or between the failure rate high threshold and the failure rate low threshold;

in response to the first historical connection failure rates being higher than the failure rate high threshold, determining whether the second historical connection failure rates are higher than the failure rate high threshold;

in response to the second historical connection failure rates being higher than the failure rate high threshold, setting the retry number to be a retry number low threshold; and setting the retry time interval to be a first normal value;

in response to the second historical connection failure rates being not higher than the failure rate high threshold, increasing the retry number and the retry time interval;

in response to the first historical connection failure rates being lower than the failure rate low threshold, setting the retry number to be a second normal value; and setting the retry time interval to be a retry time interval low threshold; and in response to the first historical connection failure rates being between the failure rate high threshold and the failure rate low threshold, setting the retry number to be the second normal value; and setting the retry time interval to be the first normal value.

6. A method for data transmission in a mobile network, the method comprising:
receiving a data transmission request;
acquiring location information associated with a current location of a mobile terminal;
acquiring one or more transmission parameters determined based on at least information associated with network condition information corresponding to the location information; and
uploading data to a server based on at least information associated with the one or more transmission parameters,
wherein:
the network condition information corresponds to statistical information collected within a historical time period at the current location of the mobile terminal in a network where the mobile terminal is located;
the network condition information includes one or more of: one or more historical network speeds, one or more first historical connection failure rates and one or more historical connection times;
the one or more transmission parameters include one or more of: a connection timeout, a read timeout, a file fragment size, a retry number and a retry time interval;
the read timeout is determined; and
the determination of the read timeout includes:
setting a value v, wherein more than 50% of the historical network speeds are greater than v and the rest of the historical network speeds are smaller than v; and
setting the read timeout to be M, wherein M=L*2/V, and L represents a determined file segment size.

7. A server comprising:
a data transmission request reception unit;
a transmission parameter determination unit; and
a data issuing unit;
wherein:
a mobile terminal is configured to receive a data transmission request, acquire location information associated with a current location of the mobile terminal, send the data transmission request including the location information to the data transmission request reception unit, and receive data sent by the data issuing unit;
the data transmission request reception unit is configured to receive the data transmission request including the location information from the mobile terminal, and send the data transmission request to the transmission parameter determination unit;
the transmission parameter determination unit is configured to acquire network condition information corresponding to the location information, determine one or more transmission parameters sine the network condition information and send the one or more transmission parameters to the data issuing unit;
the data issuing unit is configured to send data to the mobile terminal based on at least information associated with the one or more transmission parameters;
the network condition information corresponds to statistical information collected within a historical time period at the current location of the mobile terminal in a network where the mobile terminal is located;
the network condition information includes one or more of: one or more historical network speeds, one or more first historical connection failure rates and one or more historical connection times;
the transmission parameter determination unit includes a connection timeout determination module; and
the connection timeout determination module is configured to average the historical connection times to obtain an average connection time t, and set the connection timeout to a value t1 that is greater than the average connection time, wherein more than 50% of the historical connection times are smaller than t1, and the rest of the historical connection times are greater than t1.

8. A server comprising:
a data transmission request reception unit;
a transmission parameter determination unit; and
a data issuing unit;
wherein:
a mobile terminal is configured to receive a data transmission request, acquire location information associated with a current location of the mobile terminal, send the data transmission request including the location information to the data transmission request reception unit, and receive data sent by the data issuing unit;
the data transmission request reception unit is configured to receive the data transmission request including the location information from the mobile terminal, and send the data transmission request to the transmission parameter determination unit;
the transmission parameter determination unit is configured to acquire network condition information corresponding to the location information, determine one or more transmission parameters using the network condition information and send the one or more transmission parameters to the data issuing unit;
the data issuing unit is configured to send data to the mobile terminal based on at least information associated with the one or more transmission parameters;
the network condition information corresponds to statistical information collected within a historical time period at the current location of the mobile terminal in a network where the mobile terminal is located;
the network condition information includes one or more of: one or more historical network speeds, one or more first historical connection failure rates and one or more historical connection times;
the transmission parameter determination unit includes a file fragment size determination module;
the file fragment size determination module is configured to:
average the historical network speeds in the historical time period to obtain a historical average network speed;
determine whether the historical average speed is greater than a high speed threshold, smaller than a low speed threshold, or between the high speed threshold and the low speed threshold;
in response to the historical average speed being greater than the high speed threshold, set the file fragment size to be a file fragment high threshold;
in response to the historical average speed being smaller than the low speed threshold, set the file fragment size to be a file fragment low threshold; and
in response to the historical average speed being between the high speed threshold and the low speed threshold, set the file fragment size to be a file fragment normal value.

9. A server comprising:
a data transmission request reception unit;
a transmission parameter determination unit; and
a data issuing unit;
wherein:
- a mobile terminal is configured to receive a data transmission request, acquire location information associated with a current location of the mobile terminal, send the data transmission request including the location information to the data transmission request reception unit, and receive data sent by the data issuing unit;
- the data transmission request reception unit is configured to receive the data transmission request including the location information from the mobile terminal, and send the data transmission request to the transmission parameter determination unit;
- the transmission parameter determination unit is configured to acquire network condition information corresponding to the location information, determine one or more transmission parameters using the network condition information and send the one or more transmission parameters to the data issuing unit;
- the data issuing unit is configured to send data to the mobile terminal based on at least information associated with the one or more transmission parameters;
- the network condition information corresponds to statistical information collected within a historical time period at the current location of the mobile terminal in a network where the mobile terminal is located;
- the network condition information includes one or more of: one or more historical network speeds, one or more first historical connection failure rates and one or more historical connection times;
- the transmission parameter determination unit includes: a retry number determination module and a retry time interval determination module;
- the retry number determination module is configured to:
  - acquire one or more second historical connection failure rates associated with an area adjacent to the current location of the mobile terminal;
  - determine whether the first historical connection failure rates are higher than a failure rate high threshold, lower than a failure rate low threshold, or between the failure rate high threshold and the failure rate low threshold;
  - in response to the first historical connection failure rates being higher than the failure rate high threshold, determine whether the second historical connection failure rates are higher than the failure rate high threshold;
  - in response to the second historical connection failure rates being higher than the failure rate high threshold, set the retry number to be a retry number low threshold;
  - in response to the second historical connection failure rates being not higher than the failure rate high threshold, increase the retry number;
  - in response to the first historical connection failure rates being lower than the failure rate low threshold, set the retry number to be a second normal value; and
  - in response to the first historical connection failure rates being between the failure rate high threshold and the failure rate low threshold, set the retry number to be the second normal value;
- the retry time interval determination module is configured to:
  - acquire the second historical connection failure rates associated with an area adjacent to the current location of the mobile terminal;
  - determine whether the first historical connection failure rates are higher than the failure rate high threshold, lower than the failure rate low threshold, or between the failure rate high threshold and the failure rate low threshold;
  - in response to the first historical connection failure rates being higher than the failure rate high threshold, determine whether the second historical connection failure rates are higher than the failure rate high threshold;
  - in response to the second historical connection failure rates being higher than the failure rate high threshold, set the retry time interval to be a first normal value;
  - in response to the second historical connection failure rates being not higher than the failure rate high threshold, increase the retry time interval;
  - in response to the first historical connection failure rates being lower than the failure rate low threshold, set the retry time interval to be a retry time interval low threshold; and
  - in response to the first historical connection failure rates being between the failure rate high threshold and the failure rate low threshold, set the retry time interval to be the first normal value.

10. A server comprising:
a data transmission request reception unit;
a transmission parameter determination unit; and
a data issuing unit;
wherein:
- a mobile terminal is configured to receive a data transmission request, acquire location information associated with a current location of the mobile terminal, send the data transmission request including the location information to the data transmission request reception unit, and receive data sent by the data issuing unit;
- the data transmission request reception unit is configured to receive the data transmission request including the location information from the mobile terminal, and send the data transmission request to the transmission parameter determination unit;
- the transmission parameter determination unit is configured to acquire network condition information corresponding to the location information, determine one or more transmission parameters using the network condition information and send the one or more transmission parameters to the data issuing unit;
- the data issuing unit is configured to send data to the mobile terminal based on at least information associated with the one or more transmission parameters;
- the network condition information corresponds to statistical information collected within a historical time period at the current location of the mobile terminal in a network where the mobile terminal is located;
- the network condition information includes one or more of: one or more historical network seeds, one or more first historical connection failure rates and one or more historical connection times;

the transmission parameter determination unit includes:
a read timeout determination module; and
the read timeout determination module is configured to:
set a value v, wherein more than 50% of the historical network speeds are greater than v and the rest of the historical network speeds are smaller than v; and
set the read timeout to be M, wherein M=L*2/V, and L represents a determined file segment size.

* * * * *